(12) United States Patent
Persson et al.

(10) Patent No.: US 8,264,422 B1
(45) Date of Patent: Sep. 11, 2012

(54) SAFE HEAD-UP DISPLAY OF INFORMATION

(75) Inventors: Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1303 days.

(21) Appl. No.: 11/937,488

(22) Filed: Nov. 8, 2007

(51) Int. Cl. *G09G 5/00* (2006.01)
(52) U.S. Cl. .............................. 345/8; 345/7; 455/456.1
(58) Field of Classification Search .................. 345/7–9; 455/456.1–457
See application file for complete search history.

(56) References Cited

U.S. PATENT DOCUMENTS

| | | | |
|---|---|---|---|
| 3,848,974 A * | 11/1974 | Hosking et al. ................... | 345/7 |
| 6,452,544 B1 | 9/2002 | Hakala et al. | |
| 6,526,352 B1 | 2/2003 | Breed et al. | |
| 6,900,731 B2 | 5/2005 | Kreiner et al. | |
| 7,091,852 B2 | 8/2006 | Mason et al. | |
| 7,245,216 B2 | 7/2007 | Burkley et al. | |
| 7,305,102 B2 | 12/2007 | Nagasaki | |
| 7,908,556 B2 | 3/2011 | Shamma et al. | |
| 8,055,296 B1 | 11/2011 | Persson et al. | |
| 2003/0064718 A1 | 4/2003 | Haines et al. | |
| 2003/0076980 A1 | 4/2003 | Zhang et al. | |
| 2003/0206099 A1 | 11/2003 | Richman | |
| 2003/0222892 A1 | 12/2003 | Diamond et al. | |
| 2004/0082341 A1 | 4/2004 | Stanforth | |
| 2005/0048918 A1 | 3/2005 | Frost et al. | |
| 2005/0068171 A1 | 3/2005 | Kelliher et al. | |
| 2005/0090201 A1 | 4/2005 | Lengies et al. | |
| 2005/0093976 A1 | 5/2005 | Valleriano et al. | |
| 2005/0137786 A1 | 6/2005 | Breed et al. | |
| 2005/0181806 A1 | 8/2005 | Dowling et al. | |
| 2005/0200478 A1 | 9/2005 | Koch et al. | |
| 2006/0024627 A1 * | 2/2006 | Platts ............................... | 431/14 |
| 2006/0079187 A1 | 4/2006 | Struck | |
| 2006/0103590 A1 * | 5/2006 | Divon ............................... | 345/7 |
| 2006/0158329 A1 | 7/2006 | Burkley et al. | |
| 2007/0036100 A1 | 2/2007 | Shaffer et al. | |
| 2007/0067104 A1 | 3/2007 | Mays | |
| 2007/0086764 A1 | 4/2007 | Konicek | |
| 2007/0132663 A1 | 6/2007 | Iba et al. | |
| 2007/0173266 A1 | 7/2007 | Barnes, Jr. | |
| 2007/0220108 A1 | 9/2007 | Whitaker | |
| 2008/0055194 A1 * | 3/2008 | Baudino et al. .................... | 345/8 |
| 2008/0088527 A1 * | 4/2008 | Fujimori et al. ................... | 345/7 |
| 2008/0089587 A1 | 4/2008 | Kim et al. | |
| 2009/0011799 A1 | 1/2009 | Douthitt et al. | |
| 2009/0322881 A1 | 12/2009 | Shu et al. | |
| 2010/0029296 A1 | 2/2010 | Noonan et al. | |

OTHER PUBLICATIONS

Office Action dated Aug. 16, 2010, U.S. Appl. No. 11/936,074 (11 pgs.).
Final Office Action dated Feb. 2, 2011, U.S. Appl. No. 11/936,074.
Advisory Action dated Apr. 22, 2011, U.S. Appl. No. 11/936,074.
Notice of Allowance dated Jun. 23, 2011, U.S. Appl. No. 11/936,074.
Ng, Sei Y., et al., "Distribution Center Head-up Display", filed Aug. 3, 2007, U.S. Appl. No. 11/833,758.

(Continued)

*Primary Examiner* — Kimnhung Nguyen (57) ABSTRACT

A system is provided for display of information. The system includes an audio device, a transparent display, and a mobile device in communication with the audio device and the transparent display. The mobile device projects information to the transparent display, and decreases projection of the information to the transparent display in response to a detection of an unsafe condition.

20 Claims, 6 Drawing Sheets

OTHER PUBLICATIONS

Persson, Carl J., et al., "Head-up Security Display", filed Aug. 3, 2007, U.S. Appl. No. 11/833,747.
Persson, Carl J., et al., "Head-up Display Communication System and Method", filed Nov. 6, 2007, U.S. Appl. No. 11/936,074.
Office Action dated Sep. 23, 2008, U.S. Appl. No. 11/833,758 (19 pgs.).
Final Office Action dated Mar. 13, 2009, U.S. Appl. No. 11/833,758 (25 pgs.).
Advisory Action dated May 21, 2009, U.S. Appl. No. 11/833,758 (4 pgs.).
Examiner's Answer dated Nov. 25, 2009, U.S. Appl. No. 11/833,758 (25 pgs.).
Office Action dated Jul. 12, 2010, U.S. Appl. No. 11/936,074 (6 pgs.).
Office Action dated Sep. 23, 2011, U.S. Appl. No. 11/833,747, filed Aug. 3, 2007.
Decision on Appeal dated Mar. 9, 2012, U.S. Appl. No. 11/833,758, filed Aug. 3, 2007.
Office Action dated Jan. 20, 2012, U.S. Appl. No. 11/833,747, filed Aug. 3, 2007.
Office Action Restriction dated Aug. 16, 2011, U.S. Appl. No. 11/833,747.
Advisory Action dated Jun. 27, 2012, U.S. Appl. No. 11/833,747, filed Aug. 3, 2007.

* cited by examiner

SAFE HEAD-UP DISPLAY OF INFORMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Distribution centers incur significant expenses training workers to store and retrieve items. Even after training, storage and retrieval mistakes are common. Workers can use mobile devices to identify an item location, such as the location where an item should be stored or the location where the item should be retrieved. However, these mobile devices can be inefficient because they require the use of at least one of the worker's hands and may also require the worker to look away from the item to be stored or retrieved. Additionally, the inventory of items stocked can change between the time a worker initially begins retrieving items and the time the worker actually arrives at a specific location in the distribution center or warehouse to retrieve a specific item. Reporting out of stock items during a hectic retrieval process can lead to errors.

SUMMARY

In some embodiments, a system is provided for display of information. The system includes an audio device, a transparent display, and a mobile device in communication with the audio device and the transparent display. The mobile device projects information to the transparent display, and decreases projection of the information to the transparent display in response to a detection of an unsafe condition.

In other embodiments, a method is provided for display of information. Information is projected to a transparent display via the mobile device. Projection of the information to the transparent display is decreased in response to a detection of an unsafe condition.

In still other embodiments, a method is provided for display of information. Information is project to a transparent display via the mobile device. The display intensity of the transparent display is dimmed in response to a detection of an unsafe condition.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for display of information in a distribution center, a warehouse, a factory, a grocery store, and other environments. The system includes a mobile device in communication with an audio device and a transparent display. A mobile device user can orally submit a request for information through the audio device, leaving the user's hands free for other tasks. The mobile device outputs the requested information to the transparent display. The transparent display can project images of the information on a lens worn by the user, such that the user does not have to look down or away from items in the environment to see the information.

However, projecting information on a transparent display worn by a user may create risks during unsafe conditions. The mobile device may partially or completely decrease or dim the projection of information on the transparent display in response to detecting an unsafe condition, such as the user running, the user going up or down a flight of stairs, the user working near dangerous machines or areas, the user entering an environment with excessive darkness, or the user falling. The mobile device may communicate with a camera, a GPS receiver, a motion detector, or a digital compass to detect some of these unsafe conditions. If the user falls, the mobile device can send an alert message to appropriate message receivers, such as the user's supervisor or on-site medical professionals. The mobile device can determine the user's location and compare the user's location to the location of dangerous areas and dangerous machines to decrease projection of the information to the transparent display even when the user may be unaware of the danger. The mobile device has a light meter that can detect excessive darkness in the user's environment, which may create a risk if the brightness of the information projected on the transparent display prevents the user from seeing the environment.

While the projection of the information on the transparent display is decreased, the mobile device can convert some or all of the information to audio signals and output the signals to the audio device, thereby continuing to provide information to the user when the projection of information on the transparent display is decreased. When the mobile device detects that the unsafe condition no longer exists, the mobile device can increase the projection of the information to the transparent display if the projection of the information to the transparent display is decreased, or increase the display intensity of the transparent display if the information projected on the transparent display is dimmed.

Figure 1:
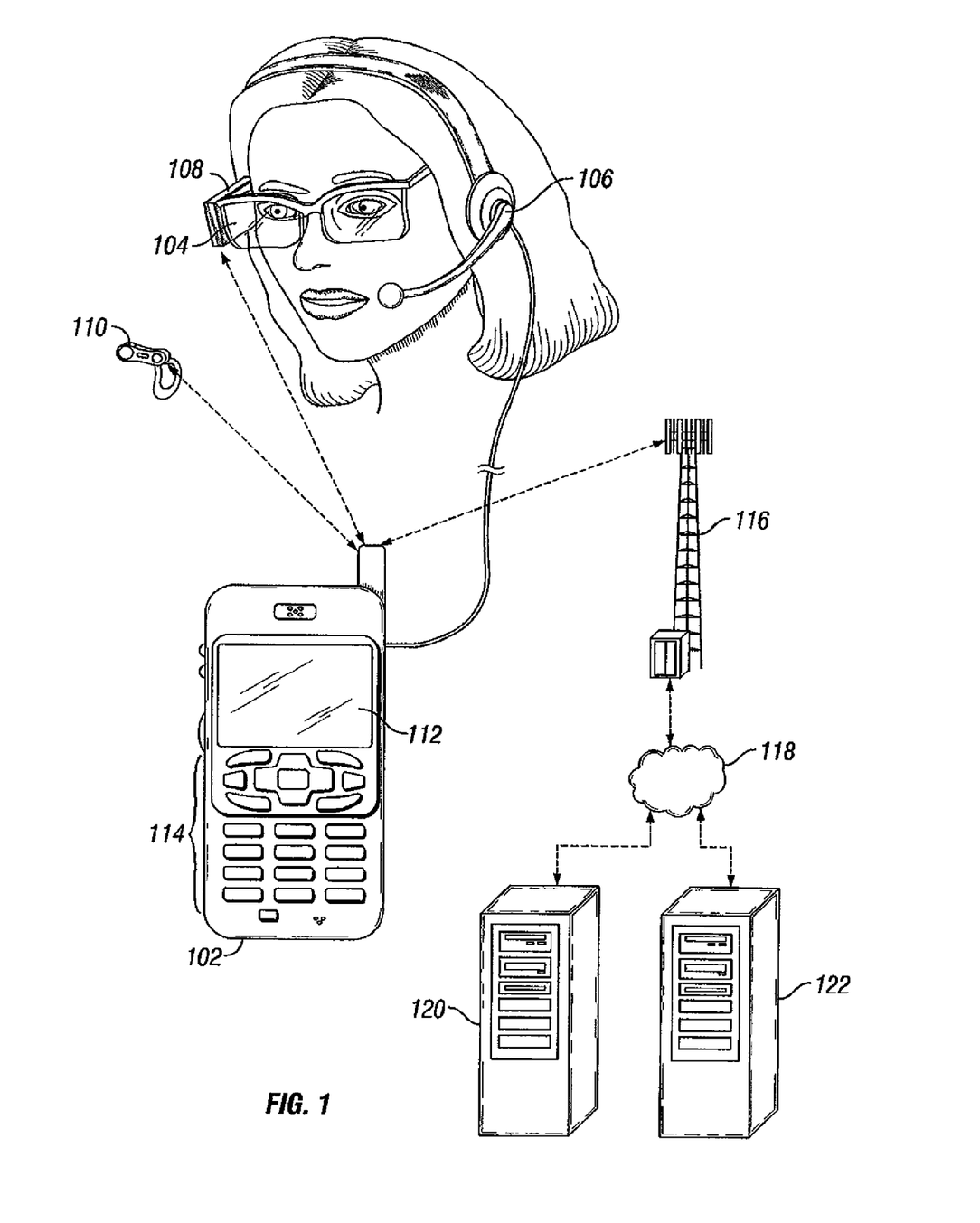
FIG. 1 illustrates a wireless communications system for display of information according to some embodiments of the present disclosure.

FIG. 1 shows a wireless communications system including the mobile device 102. FIG. 1 depicts the mobile device 102, which is operable for implementing aspects of the present disclosure, but the present disclosure should not be limited to these implementations. Though illustrated as a mobile phone, the mobile device 102 may take various forms including a wireless mobile device, a pager, a personal digital assistant (PDA), a portable computer, a tablet computer, or a laptop computer. Many suitable mobile devices combine some or all of these functions. In some embodiments of the present disclosure, the mobile device 102 is not a general purpose computing device like a portable, laptop or tablet computer, but rather is a special-purpose communications device such as a mobile phone, wireless mobile device, pager, or PDA. The mobile device 102 may support specialized activities such as gaming, inventory control, job control and/or task management functions, and so on.

The mobile device 102 can communicate with a transparent display 104 and an audio device 106. The transparent display 104, which can function as a head-up display, includes a user wearable lens and a projector 108 to project images on the lens. The mobile device 102 can output content to the transparent display 104 that is projected as virtual images on the lens. The virtual or see-through images overlay the user's view of reality. The mobile device 102 can also project the content to the transparent display's 104 side panes that the user can conveniently view without any head movement by the user. The audio device 106 includes a microphone to input the user's audio signals and a speaker to output audio signals to the user. The audio device 106 may be a headset, an earpiece with a microphone, or any similar device that combines a speaker with a microphone. The mobile device 102 can also communicate with a camera 110 that can capture images of items viewed through the transparent display 104. Because the camera 110 can be located near the transparent display's 104 projector 108, the camera 110 can provide feedback to the mobile device 102 regarding what the user can see. The camera feedback can include the viewer's orientation, such as facing due north in a warehouse aisle that is oriented from south to north.

The mobile device 102 may include a display 112 and a touch-sensitive surface or keys 114 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 112 to show a web page. The web page may be obtained via wireless communications with a cell tower 116, a wireless network access node, a peer mobile device 102 or any other wireless communication network or system. The cell tower 116 (or wireless network access node) is coupled to a wired network 118, such as the Internet. Via the wireless link and the wired network, the mobile device 102 has access to information on various servers, such as a communication server 120 and a content server 122. The content server 122 may provide content that may be shown on the display 112. Alternately, the mobile device 102 may access the cell tower 116 through a peer mobile device 102 acting as an intermediary, in a relay type or hop type of connection. The content server 122 can include a database for items, such as items that can be stored in a distribution center, locations in the distribution center, and applications that can promote determining item locations in the distribution center.

Figure 2:
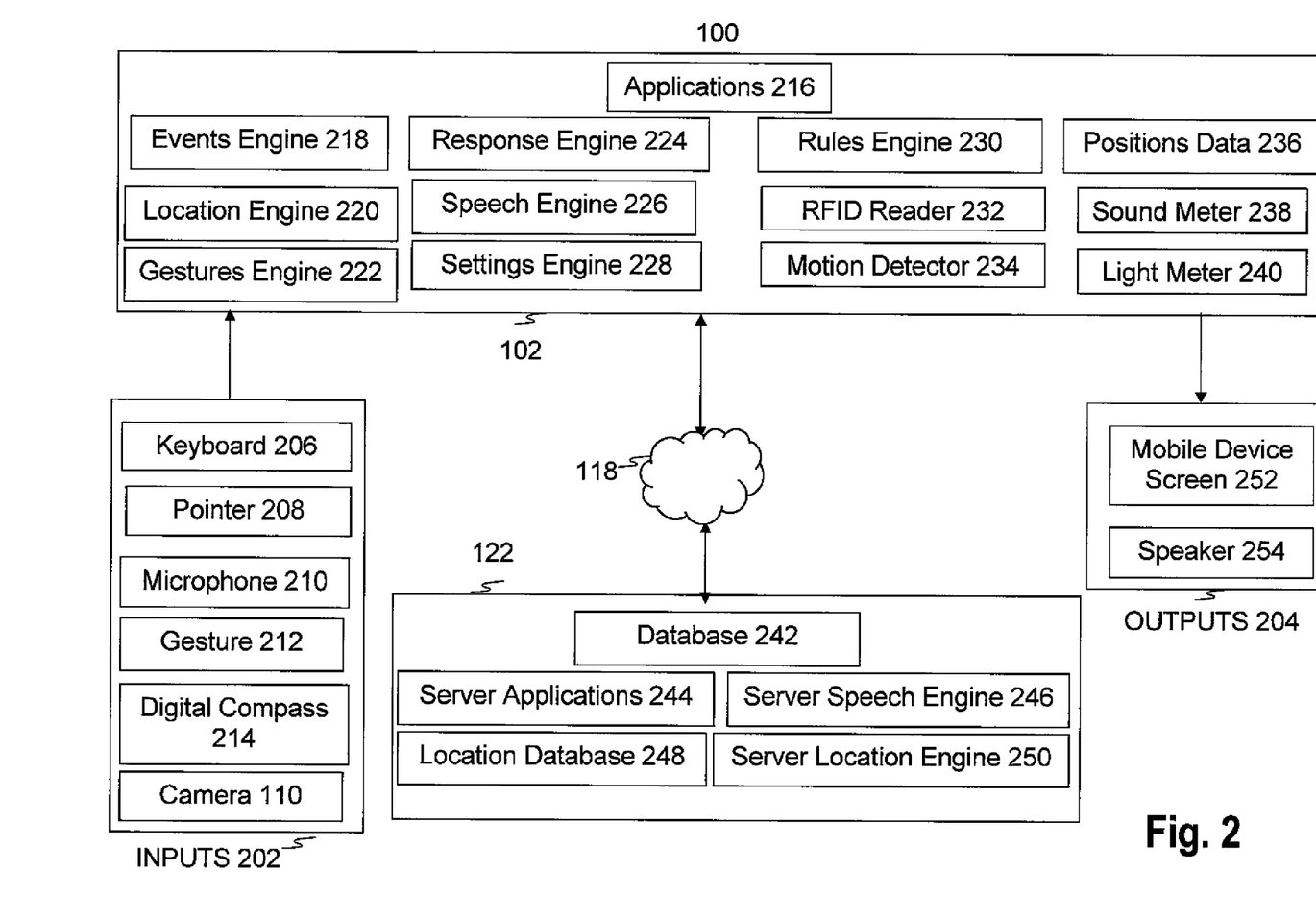
FIG. 2 shows a block diagram of an illustrative wireless communications system for display of information.

FIG. 2 is a block diagram illustrating the wireless communications system 100 for display of information according to some embodiments of the present disclosure. The system includes inputs 202 to and outputs 204 from the mobile device 102. The inputs 202 can be via a keyboard 206, a pointer 208, a microphone 210, a gesture 212 input, a digital compass 214, and the camera 110. For example, a supervisor of the user can enter a text message via the keyboard 206, which can be a computer keyboard in communication with the content server 122. The text message can be communicated to the mobile device 102, and projected on the transparent display 104 or output as an audio signal via the audio device 106. Additionally, the supervisor can select messages through the pointer 208, which can be a computer mouse or similar input device in communication with the content server 122. The user can speak into the microphone 210 on the audio device 106 to request the mobile device 102 to determine information, such as the location of an item.

The user can enter a gesture 212 input to the mobile device 102 by aligning the user's finger with an option projected on the transparent display 104. The camera 110 captures an image, for example, of the finger and its location, which can be identified as aligned with the option projected on the transparent display 104. The mobile device 102 can process the gesture 212 input by executing the option selected by the user's finger. The digital compass 214 is on the transparent display 104, and is a multi-axis sensor that can determine not only the heading, but also the roll and the pitch for the transparent display 104. The digital compass 214 inputs information to the mobile device 102 to identify the transparent display's 104 orientation, and hence the view of the user. For example, if the user's head is facing directly northeast, directly toward the horizon, and without any tilt, the digital compass 214 inputs the orientation to the mobile device 102. The orientation information enables the mobile device 102 to project images on the transparent display 104 as transparent overlays on items whose images are captured by the camera 110. For example, when the user is looking for a specific item in a distribution center, the camera 110 can capture an image of the item that is recognized by the mobile device 102. The mobile device 102 can respond by outputting a transparent overlay on the transparent display 104, based on the orientation information, which identifies the specific item to the user. An example of a transparent overlay projected on the transparent display 104 is described below in reference to FIG. 4.

The mobile device 102 can include components 216 to 240 that can assist in providing information to a user. The components 216 to 240 can include applications 216, an events engine 218, a location engine 220, a gestures engine 222, a response engine 224, a speech engine 226, a settings engine 228, a rules engine 230, a radio frequency identifier (RFID) reader 232, a motion detector 234, positions data 236, a sound meter 238, and a light meter 240. The applications 216 can provide interfaces between the mobile device 102, the inputs 202, the outputs 204, and the content server 122. The events engine 218 can determine when to send some of the outputs 204 based on periodic events, such as an hourly text message of the user's work efficiency relative to efficiency goals. The location engine 220 can promote inputting a request for an item location, determining the item location, and projecting item location information. The location engine 220 can also store item location information. The gestures engine 222 can recognize the significance of the gesture 212 input as captured by the camera 110 and determine the response to the gesture 212 input.

The response engine 224 can execute the appropriate response for a gesture 212 input or other inputs 202. The speech engine 226 can convert audio signals input via the microphone 210 on the audio device 106 and execute speech recognition software to determine the appropriate response to the audio signal. For example, when the user says "efficiency," the microphone 210 inputs this audio signal and the speech engine converts the audio signal to a request to project the user's work efficiency for the current day. The speech engine 226 can also execute speech recognition software to convert audio information to text, such as converting oral comments recorded by one mobile device user to text projected on the transparent display of another mobile device user. The settings engine 228 can keep track of settings for the mobile device 102, such as the intensity of images projected on the transparent display 104 and whether speech input is enabled.

The rules engine 230 can specify the procedure used in determining item location, such as referencing the location engine 220 on the mobile device 102 before accessing any location database located elsewhere. The RFID reader 232 is an electronic tag reader that can detect a RFID signal from an item's RFID tag and determine the item's identity based on the RFID signal. The RFID reader 232 can be used to associate any additional information with the RFID tag of the item. The motion detector 234 can function as a pedometer to assist in determining the location of the mobile device 102, such as when the user walks in a distribution center.

The positions data 236 can assist the mobile device 102 in determining item location information based on the position of the requested item relative to the position of the mobile device 102 and the position of any fixed locations, such as a beacon in a distribution center. The sound meter 238 can evaluate the audio signal via the microphone 210 to determine when background sounds are so loud that the speech engine 226 will have difficulty with speech recognition or the user will have difficulty hearing outputs via the audio device 106. The light meter 240 can evaluate the distribution center's light via the camera 110 to determine when the light is so bright that the camera 110 will have difficulty identifying items, images, and gestures, or the user will have difficulty viewing projected information via the transparent display 104.

The content server 122 can include a database 242, server applications 244, a server speech engine 246, a location database 248, and a server location engine 250 to assist the mobile device 102 in determining an item location. The database 242 can store captured images of stored items to assist the user of the mobile device 102 to identify an item as the requested item. The server application 244 can provide interfaces between the mobile device 102 and the content server 122.

The server speech engine 246 can convert audio signals input via the microphone 210 and execute speech recognition software to determine the appropriate response to the audio signal. The locations database 248 can store item location information. The server location engine 250 can input a request for an item location, determine the item location, and output item location information. The functions of recognizing speech, storing item location information, and determining item location can be implemented on the mobile device 102, the content server 122, or a combination of the mobile device 102 and the content server 122. In other embodiments, some of the components 216 to 240 can be implemented on the content server 122 and some of the components 242 to 250 can be implemented on the mobile device 102.

The outputs 204 include a mobile device screen 252 and a speaker 254. The mobile device screen 252 is the graphical output for the transparent display 104. The speaker 254 is the audio output for the audio device 106.

Figure 3:
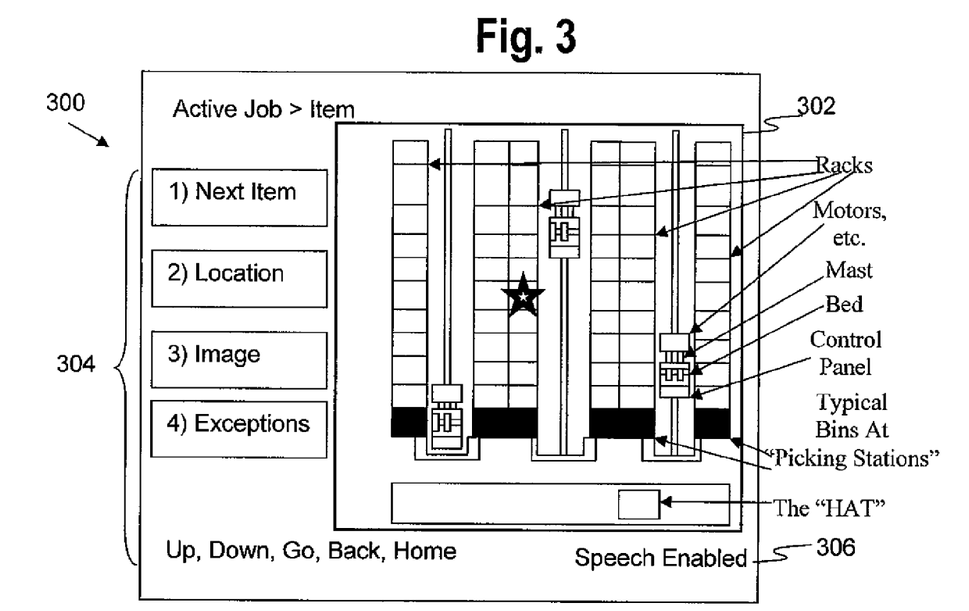
FIG. 3 shows a graphical user interface for display of information according to some embodiments of the present disclosure.

FIG. 3 shows a graphical user interface 300 for display of information according to some embodiments of the present disclosure. The graphical user interface 300 is projected on the transparent display 104, and can include a graphical output 302, input options 304, and a communication status 306. For example, the graphical output 302 can be a map of a distribution center that projects a star to inform a user of an item location. In another example, the input options 304 can include a text message "location" that informs the user of a specific spoken command that initiates a specific response. The audio device 106 can detect the user speaking the word "location," and the mobile device 102 can respond to this spoken command by sending a new output to the transparent display 104, with the new output including item location information.

The communication status 306 depicts the status of communication inputs and outputs, such as whether speech input and speech output are enabled. If the sound meter 238 detects too much background noise, such that the speech engine 226 has difficulty with speech recognition from audio inputs, the mobile device 102 can temporarily disable speech input. If the user of the mobile device 102 is having difficulty hearing outputs via the audio device 106, the user can request to temporarily disable speech output. When speech is temporarily disabled, subsequent inputs can still occur via the camera 110 and subsequent outputs can still occur via the transparent display 104. Based on the user's preferences, the user of the mobile device 102 may have previously selected for some outputs to occur via the transparent display 104 and some outputs to occur via the audio device's 106 speaker 254. If the user of the mobile device 102 temporarily disables speech, all outputs may occur via the transparent display 104, even outputs previously occurring via the audio device's 106 speaker 254.

Likewise, the intensity of the distribution center light detected by the camera 110 may be too bright or too dark for inputs via the camera 110 and safe projection of information via the transparent display 104. The mobile device 102 can respond to excessively bright light or excessive darkness by conducting all subsequent inputs via the audio device's 106 microphone 210 and all subsequent outputs via the audio device's 106 speaker 254. When the background sound or the detected light returns to a level that enables the previous input and output selections, the mobile device 102 can either automatically revert to the selections or provide the user of the mobile device 102 with the option of reverting to the selections.

When the graphical user interface 300 is projected to the transparent display 104, the user of the mobile device 102 may have a diminished capacity to see and recognize details in the user's environment through the transparent display 104 due to obstruction, obscuring, distraction, or other reasons recognized by those of skill in the art. When the mobile device 102 detects an unsafe condition, the mobile device 102 may partially or completely decrease the projection of the information to the transparent display 104 to avoid risks to the user of the mobile device 102 and to the environment around the user.

Figure 4:
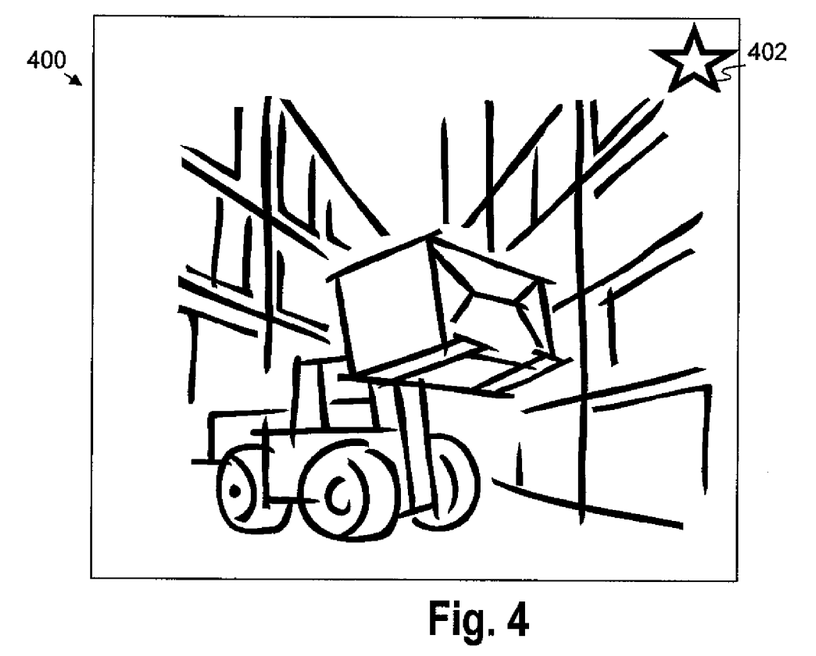
FIG. 4 shows another graphical user interface for display of information according to some embodiments of the present disclosure.

FIG. 4 shows yet another graphical user interface 400 for display of information according to some embodiments of the present disclosure. The graphical user interface 400 depicts a user's view through the transparent display 104. While the user is viewing a forklift lifting a box in an aisle of a distribution center, the mobile device 102 projects a star 402 on the transparent display 104. The star 402 indicates the location of a requested item. The star 402 is overlaid on the transparent display 104 to appear as if the star is on the requested item. The star 402 is used as an illustrative example, as the transparent display 104 can project other images to assist the user of the mobile device 102 in locating a requested item. For example, the transparent display 104 can overlay the requested item with a flashing green light, such that the requested item appears to be flashing green to the user of the mobile device 102. When the graphical user interface 400 is projected to the transparent display 104 while the user of the mobile device 102 is in an excessively dark environment, the user may not be able to see much of the user's environment through the transparent display 104 due to the brightness of the star 402. When the light meter 240 detects excessive darkness, the mobile device 102 may partially or completely decrease the projection of the information to the transparent display 104 to avoid risks to the user of the mobile device 102 and to the environment around the user.

Figure 5:
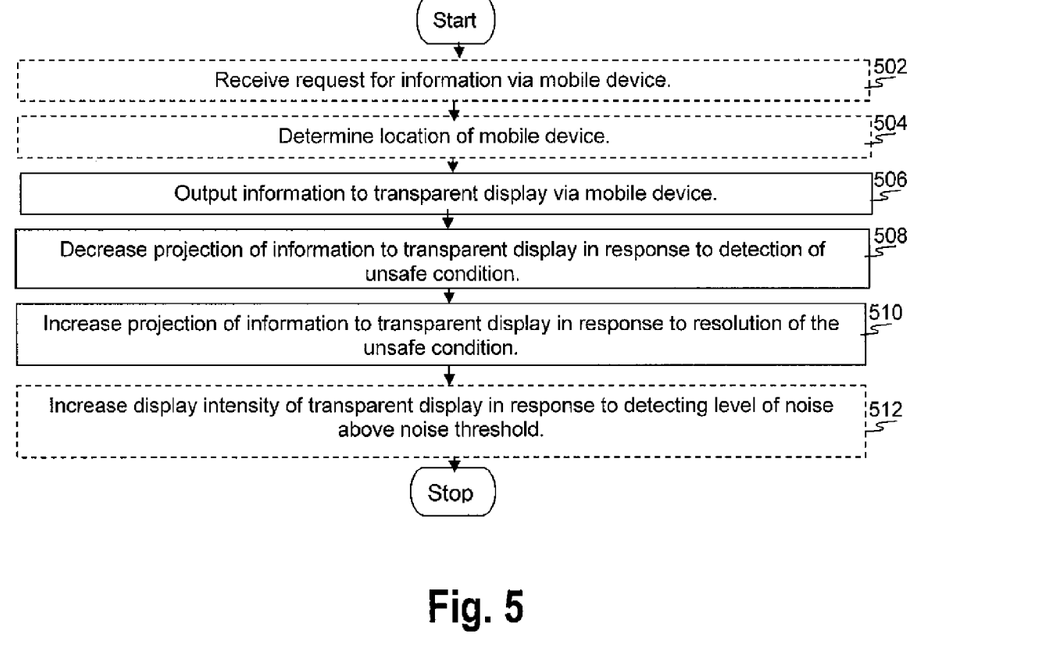
FIG. 5 shows a flowchart of a method for display of information according to some embodiments of the present disclosure.

FIG. 5 is a flowchart illustrating a method for display of information according to some embodiments of the present disclosure. The mobile device 102 can use the method to safely display information, despite the possibility of unsafe conditions arising in a user's environment.

In box 502, the mobile device optionally receives a request for information. For example, the mobile device 102 can receive a request via the audio device's 106 microphone 210, the pointer 208, the keyboard 206, or the camera 110 for information, such as the location of an item in a warehouse. The mobile device 102 can use the speech engine 226 to execute speech recognition software for recognizing requests input via the audio device's 106 microphone 210. The mobile device 102 can also input requests submitted by the user's supervisor via the pointer 208 or the keyboard 206 that communicate with the supervisor's computer.

Additionally, the mobile device 102 can use the gestures engine 222 to execute gesture recognition software for recognizing images of gestures captured by the camera 110. For example, the gestures engine 222 can determine that the location of the user's index finger, as captured by the camera 110, is aligned with the location of an input option projected on the transparent display 104, such that to the user's perspective the user's index finger appears to be touching the projected input option. In this situation, which may occur when background noise is too loud for the speech engine 226 to accurately recognize speech commands, the gestures engine 222 enables the mobile device 102 to execute the input option identified by the user's index finger. The transparent display 104 can capture gestures by alternative means, such as by detecting a head nod by a user wearing the transparent display 104, or any other motion detected by the mobile device 102.

In box 504, the mobile device optionally determines the location of the mobile device. An unsafe condition may be detected based on determining the location of the mobile device 102 in relation to the location of a dangerous machine, such as moving forklifts, or the location of a dangerous area, such as an intersection or a ledge where multiple accidents have been recorded as occurring. The mobile device 102 may identify the location of the mobile device 102 as a location associated with an unsafe condition based on the location of the mobile device 102 relative to the locations that a map, or other form of structured information, specifies as the locations where dangerous machines routinely operate or where accidents have occurred. Alternatively, the mobile device 102 may identify the location of the mobile device 102 and receive communications specifying the locations of dangerous machines. In an embodiment, radio frequency identification (RFID) tags or other tags may be attached to dangerous machines, and the mobile device 102 may determine a proximity of a dangerous machine to the mobile device 102, and hence an unsafe condition, by detecting and/or ranging the RFID tag or other tag attached to the dangerous machine. Further, a hazard at specific locations, for example an oil spill or other hazard, may be reported and the hazard location information distributed to the mobile device 102, promoting the mobile device 102 comparing the location of the hazard to the location of the mobile device 102 to determine an unsafe condition. Other hazards may include broken glass, spilled liquids or gels, unstable stacked material or boxes, exposed electrical wires, and others.

The mobile device 102 can determine its location using at least one of a radio frequency identification technology, a global positioning system (GPS) technology, a forward link triangulation technology, a hybrid technology, and a motion detector technology. The mobile device 102 can determine its location, for example, using radio frequency identification technology by identifying electronic tags of nearby items, such as items in a distribution center, referencing the location database 248 to determine where these items are located, and fixing the location of the mobile device 102 based on the relationship between the locations of the mobile device 102 and the identified items. The identified items can be items stored in a distribution center, fixed electronic tags specifically used as beacons for determining relative location in a distribution center, or combinations of items and fixed electronic tags.

The mobile device 102 can use a global positioning system (GPS) technology to fix the location of the mobile device 102. Global positioning system satellites transmit signals that are received by the mobile device 102. The mobile device 102 determines its position based on the different signals received from different satellites. The location accuracy is environment driven and dependant on the type of equipment used. The global positioning system technology is owned and operated by the U.S. Department of Defense, but is available for general use around the world.

The mobile device 102 can use forward link triangulation technology to determine its position based on the different radio frequency signals received from different cell towers, such as the cell tower 116 and other cell towers. In radio communications, a forward link is the link from a fixed location, such as the cell tower 116 to the mobile device 102. If the link includes a communications relay satellite, the forward link will consist of both an uplink from a base station to the satellite and a downlink from the satellite to the mobile device 102. Each serving cell tower broadcasts a system parameters information message to the mobile device 102. This message includes the longitude and the latitude of the serving cell tower. The radius covered by serving cell towers vary greatly, from hundreds of meters in dense urban areas to 20 miles or more in rural environments. The forward link triangulation technology fixes the location of the mobile device 102 based on measurements taken of time and distance signals from nearby cell towers. The mobile device 102 reports the time and distance measurements to the wired network 118, then the wired network 118 triangulates a location fix of the mobile device 102, and reports the location fix back to the mobile device 102. In general, more than three surrounding cell towers are preferred to triangulate an optimal location fix.

The mobile device 102 can use a hybrid technology to fix the location of the mobile device 102 based on a combination of other location fix technologies. For example, if the mobile device 102 is indoors, but close to a window, the global positioning system technology in combination with a cell tower location technology can calculate the location fix for the mobile device 102. When the mobile device 102 is indoors, the mobile device 102 may receive signals from an insufficient number of satellites to determine the position of the mobile device 102. However, the hybrid technology can combine the signals from the insufficient number of satellites with the cell tower location identified by the channel length modulation to calculate a hybrid location fix for the mobile device 102.

The mobile device 102 can also use motion detector technology to fix the location of the mobile device 102. For example, the motion detector 102 fixes its location as the south end of aisle 5 in a distribution center based on forward link triangulation technology. If the motion detector 234, functioning as a pedometer, detects that the user of the mobile device 102 has walked 15 meters due north, the mobile device 102 combines the information from forward link triangulation technology and motion detector technology to fix the current location of the mobile device 102 as, for example, 15 meters north from the south end of aisle 5 in a distribution center.

In box 506, the mobile device projects information to the transparent display via the mobile device. For example, the mobile device 102 projects the graphical user interface 300 in FIG. 3, which includes menu options and a map depicting a location for an item to the transparent display 104 via the mobile device 102. The transparent display 104 can use the digital compass 214 to determine an orientation of the transparent display 104 such that the information can be based on the location of an item relative to the location of the transparent display 104. This item location information can be projected to the transparent display 104 as text or converted to an audio signal and output to the audio device's 106 speaker 254. For example, the item location information can be text that specifies "walk 15 meters due north and the item will be on your right on the second shelf from the bottom." The content server 122 may access a database for the information projected to the transparent display 104.

The camera 110 can capture an image of the item to compare the captured image to stored images to assist a user of the mobile device 102 in identifying the item. For example, the camera 110 captures an image of an item on the right side of the aisle in FIG. 4, and compares the captured image to stored images in the database 242 to identify the item as the requested item. The image may be a container or package for the item, general markings on the container or package, or specific markings on a consistently designated section of the container or package. In response to the identification, the mobile device 102 projects an overlay of the star 402 to the transparent display 104 to identify the requested item to the user of the mobile device 102.

In box 508, the mobile device decreases projection of the information to the transparent display in response to the detection of an unsafe condition. For example, the mobile device 102 partially or completely decreases projection of the information to the transparent display 104 in response to the motion detector 234 detecting an unsafe condition, such as the user of the mobile device 102 is running. The mobile device 102 may use other ways to detect that the user of the mobile device 102 is running, such as comparing the user's location over time and determining whether the user is moving at a speed above a safety threshold. The motion detector 234 can detect other unsafe conditions, such as when the user of the mobile device 102 is moving up or down stairs, or when the user of the mobile device 102 is falling. The mobile device 102 may use other ways to detect that the user of the mobile device 102 is moving up stairs or falling, such as comparing the user's location to known locations, for example, a floorplan map of a building, to determine that the user's location corresponds to a known location of stairs on a map or that the user's location is a few inches above a floor level specified by the map.

When the user of the mobile device 102 is falling, or has fallen, the mobile device 102 can send an alert message in to an appropriate message receiver, such as the supervisor of the user or medical professionals that are relatively close to the user's environment. The communication server 120 may record the location where the user of the mobile device 102 has fallen to identify dangerous areas.

The user of the mobile device may notice an undetected unsafe condition and request for the mobile device 102 to partially or completely decrease the projection of the information to the transparent display 104 by speaking the words "display off," such as when the user notices a spill on the floor where the user is walking. By speaking the words "unsafe condition," the user may identify the user's current location as a location that will partially or completely decrease the projection of information to other transparent displays 104 for other users who enter within a specified distance of the identified location. The identified location may continue to be identified as an unsafe condition until one of the users of the mobile devices 102 subsequently identifies the reason for the unsafe condition location as resolved.

When the projection of information to the transparent display 104 is partially or completely decreased, the mobile device 102 may convert some or all of the information that would have been projected to the transparent display 104 to an audio signal that the mobile device 102 may output to the audio device 106. By converting some or all of the information to audio signals, the mobile device 102 may continue to provide complete information to the user of the mobile device 102 even when the projection of information to the transparent display 104 is decreased.

Additionally, the mobile device 102 may partially or completely decrease the projection of the information to the transparent display 104 when the digital compass 214 detects that the transparent display 104, and thus the user's head, is looking downward for more than a specified period of time. The projection of information may not partially or completely decrease when the user who is wearing the transparent display 104 glances downward momentarily. However, the transparent display 104 may detect an unsafe condition when the user looks downward for an extended period of time, such as when the user detects a spill on the floor or when the user watches carefully as the user is going up or down a flight of stairs.

Alternatively, the mobile device 102 dims the display intensity of the transparent device 104 in response to the light meter 240 detecting an amount of light below a darkness threshold. For example, when the user of the mobile device 102 is in a dark aisle of a warehouse looking for an item, such as may be depicted by the graphical user interface 400, the light meter 240 detects that the intensity of the star 402 is so bright that the user may not be able to see anything else in the view of the transparent display 104, such as the forklift that is close to the star 402. In this situation, the mobile device 102 dims the projection on the transparent display 104 to the point where the user of the mobile device 102 may see the star 402, the dark aisle, and the forklift. The mobile device 102 may also use the camera 110 to detect an amount of light below the darkness threshold. Alternatively, the mobile device 102 may use either the light meter 240 or the camera 110 to detect an amount of light above a brightness threshold that may cause the user of the mobile device 102 to be unable to see the information projected on the transparent display. By partially or completely decreasing the projection of information to the transparent display 104, the mobile device 102 converts some or all of the information to audio information that is output to the audio device 106, such that the user may still receive the information when the environmental light is too bright to see the information projected on the transparent display 104.

In box 510, the mobile device increases the projection of the information to the transparent display in response to resolution of the unsafe condition. For example, the mobile device 102 partially or completely increases the projection of the information to the transparent display 104 in response to the motion detector 234, determining that the user of the mobile device 102 is no longer running. Alternatively, the mobile device 102 partially or completely increases the display intensity of the transparent display 104 in response to the light meter 240, detecting an increase in the amount of light above the darkness threshold.

In box 512, the mobile device optionally increases the display intensity of the transparent display in response to detecting a level of noise above a noise threshold. For example, the mobile device 102 increases the previously dimmed display intensity of the transparent display 104 because the sound meter 238 detects a level of noise above a noise threshold such that the user of the mobile device 102 may not be able to hear information that is converted to audio signals and output to the audio device 106. The mobile device 102 may also use the audio device 106 to detect a level of noise above the noise threshold, due to for example, the operation of forklifts. If the mobile device 102 partially or completely decreases projection of the information to the transparent display 104 because of an unsafe condition, the sound meter 238 detecting the level of noise above the noise level may not result in the mobile device 102 increasing the display intensity of the transparent display 104.

Figure 6:
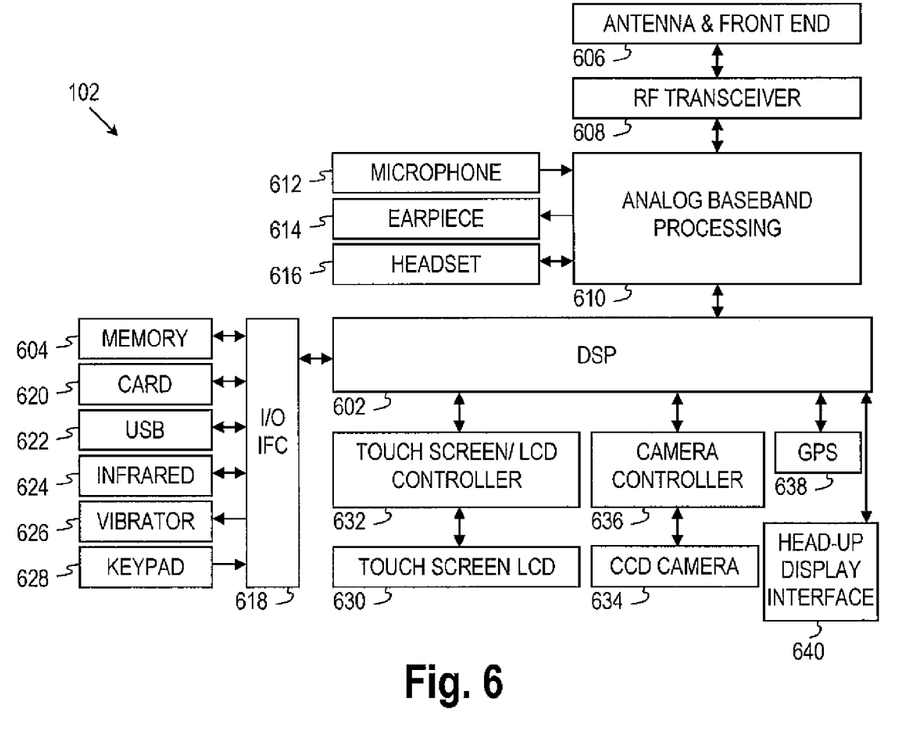
FIG. 6 shows a block diagram of a mobile device according to some embodiments of the present disclosure.

FIG. 6 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 602 and a memory 604. As shown, the mobile device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, a global positioning system (GPS) sensor 638, and a head-up display interface 640. In an embodiment, the mobile device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the mobile device 102 in accordance with embedded software or firmware stored in memory 604 or stored in memory contained within the DSP 602 itself. In addition to the embedded software or firmware, the DSP 602 may execute other applications stored in the memory 604 or made available via information carrier media, such as portable data storage media like the removable memory card 620, or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the mobile device 102 to send and receive information from a cellular network or some other available wireless communications network or from a peer mobile device 102. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions, a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF transceiver 608, portions of the antenna and front end 606, and the analog baseband processing unit 610 may be combined in one or more processing units and/or application specific integrated circuits (ASICs).

The analog baseband processing unit 610 may provide various analog processing of inputs and outputs, for example, analog processing of inputs from the microphone 612 and the headset port 616 and outputs to the earpiece speaker 614 and the headset port 616. To that end, the analog baseband processing unit 610 may have ports for connecting to the built-in microphone 612 and the earpiece speaker 614 that enable the mobile device 102 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast fourier transforming, and cyclic prefix appending, and for a receiver function the DSP 602 may perform cyclic prefix removal, fast fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 102 to function as a peripheral device to exchange information with a personal computer or other computer system. The infrared port 624 and other optional ports such as a Bluetooth interface or an IEEE 802.11 compliant wireless interface may enable the mobile device 102 to communicate wirelessly with other nearby mobile devices and/or wireless base stations.

The input/output interface 618 may further connect the DSP 602 to the vibrator 626 that, when triggered, causes the mobile device 102 to vibrate. The vibrator 626 may serve as a mechanism for silently alerting the user to any of various events such as an incoming call, a new text message, and an appointment reminder.

The keypad 628 couples to the DSP 602 via the input/output interface 618 to provide one mechanism for the user to make selections, enter information, and otherwise provide input to the mobile device 102. Another input mechanism may be the touch screen LCD 630, which may also display text and/or graphics to the user. The touch screen LCD controller 632 couples the DSP 602 to the touch screen LCD 630.

The CCD camera 634 enables the mobile device 102 to take digital pictures. The DSP 602 communicates with the CCD camera 634 via the camera controller 636. The GPS sensor 638 is coupled to the DSP 602 to decode global positioning system signals, thereby enabling the mobile device 102 to determine its position. In another embodiment, a camera operating according to a technology other than charge-coupled device cameras may be employed. The heads-up display interface 640 enables communication between the mobile device 102, the transparent display 104, the audio device 106, and the camera 110. Various other peripherals may also be included to provide additional functions (e.g., radio and television reception).

Figure 7:
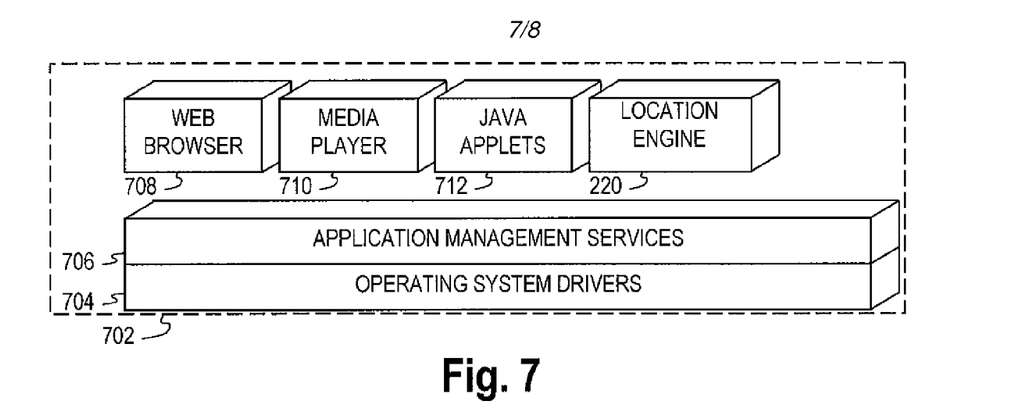
FIG. 7 shows a block diagram of an illustrative software configuration for a mobile device according to some embodiments of the present disclosure.

FIG. 7 illustrates a software environment 702 that may be implemented by the DSP 602. The DSP 602 executes operating system drivers 704 that provide a platform from which the rest of the software operates. The operating system drivers 704 provide drivers for the mobile device hardware with standardized interfaces that are accessible to application software. The operating system drivers 704 include application management services (AMS) 706 that transfer control between applications running on the mobile device 102. Also shown in FIG. 7 are a web browser application 708, a media player application 710, Java applets 712, and the location engine 220. The web browser application 708 configures the mobile device 102 to operate as a web browser, allowing a user to enter information into forms and select links to retrieve and view web pages. The media player application 710 configures the mobile device 102 to retrieve and play audio or audiovisual media. The Java applets 712 configure the mobile device 102 to provide games, utilities, and other functionality. These are further examples of content that may be provided by the content server 122. The location engine 220 application can execute a location fix technology for the mobile device 102.

Figure 8:
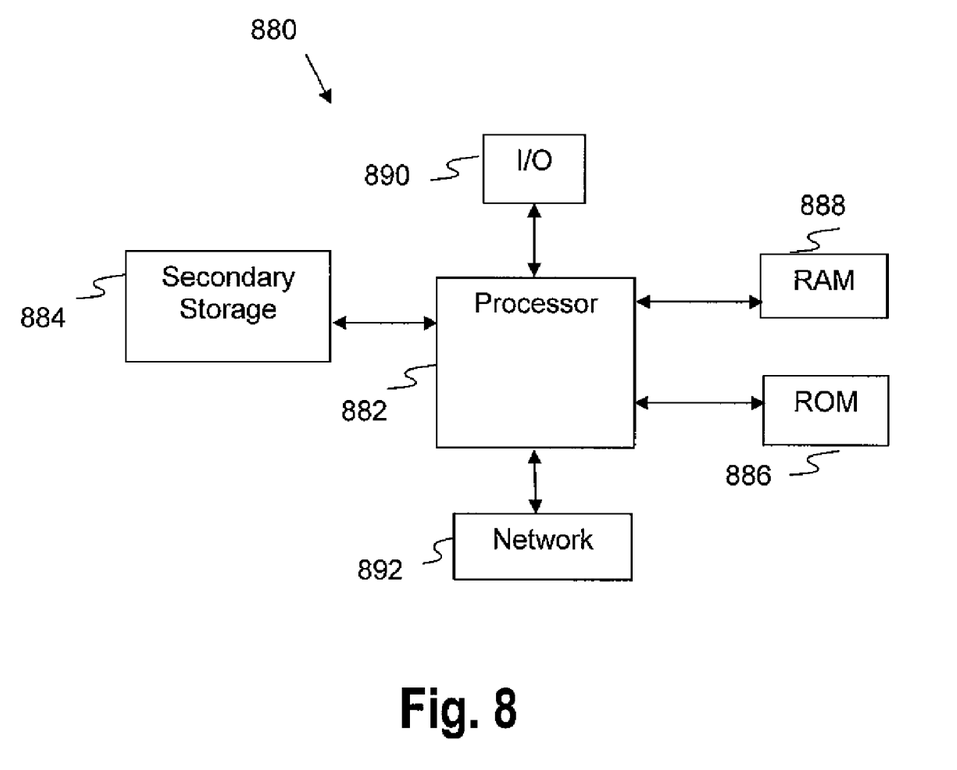
FIG. 8 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 8 illustrates an exemplary, general-purpose computer system, such as the content server 122, suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, and scripts which it accesses from hard disk, floppy disk, optical disk (these various disk-based systems may all be considered secondary storage 884), ROM 886, RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for display of information, comprising:
   an audio device;
   a transparent display; and
   a mobile device in communication with the audio device and the transparent display, wherein the mobile device is configured to project information to the transparent display, to decrease projection of the information to the transparent display in response to a detection of an unsafe condition, and to increase the projection of the information to the transparent display in response to a determination that the unsafe condition has been resolved.

2. The system of claim 1, wherein the transparent display comprises a user wearable lens and a projector to project images on the lens.

3. The system of claim 1, wherein the unsafe condition comprises a user of the mobile device running, moving on stairs, or falling, and wherein the mobile device comprises a motion detector to detect the unsafe condition based on determining that the user of the mobile device is running, moving on stairs, or falling.

4. The system of claim 3, wherein the mobile device is further configured to send an alert message to a supervisor in response to determining that the user of the mobile device is falling.

5. The system of claim 1, wherein the mobile device is further configured to determine the location of the mobile device.

6. The system of claim 5, wherein determining the location of the mobile device comprises determining the location of the mobile device relative to at least one of an item with an electronic tag and a geographically fixed electronic tag using at least one of a radio frequency identification technology, a global positioning system technology, a forward link triangulation technology, a hybrid technology, and a motion detector technology.

7. The system of claim 5, wherein the unsafe condition comprises a user of the mobile device working near a dangerous machine or a dangerous area, and wherein detection of the unsafe condition is based on determining the location of the mobile device in relation to the dangerous machine or the dangerous area.

8. The system of claim 1, wherein the mobile device is further configured to promote speech recognition.

9. The system of claim 1, wherein detecting the unsafe condition is based on the user identifying the unsafe condition.

10. The system of claim 1, wherein the mobile device is further configured to convert the information to an audio signal.

11. The system of claim 1, further comprising a camera in communication with the mobile device, wherein the camera is configured to capture an image and send the image to the mobile device, wherein the mobile device is further configured to transmit the image.

12. The system of claim 11 wherein the mobile device is further configured to promote gesture recognition for gestures captured by the camera.

13. The system of claim 1, further comprising a light meter, wherein the unsafe condition is based on the light meter detecting an amount of light below a darkness threshold.

14. The system of claim 1, further comprising a digital compass to determine an orientation of the mobile device.

15. The system of claim 1, further comprising a server in communication with the mobile device, wherein the server is configured to access a database for the information.

16. A method for display of information, comprising:
   projecting information to a transparent display via a mobile device;
   decreasing, by the mobile device, projection of the information to transparent display in response to a detection of an unsafe condition; and
   increasing, by the mobile device, the projection of the information to the transparent display in response to a determination that the unsafe condition has been resolved.

17. The method of claim 16, further comprising receiving a request for the information via at least one of a microphone, a pointer, a touch screen, a keyboard, and a camera.

18. A method for display of information, comprising:
   projecting information to a transparent display via a mobile device; and
   dimming, by the mobile device, the display intensity of the transparent display in response to a detection of an unsafe condition.

19. The method of claim 18, wherein the mobile device comprises an audio device to detect a level of noise above a noise threshold, wherein the mobile device is configured to increase the display intensity of the transparent display in response to detecting the level of noise above the noise threshold.

20. The method of claim 18, further comprising increasing, by the mobile device, the display intensity of the transparent display in response to a determination that the unsafe condition has been resolved.

* * * * *